Sept. 11, 1945.　　　　　G. RAY　　　　　2,384,769
REAR WINDOW DEHYDRATOR FOR AUTOMOBILE BODIES
Filed March 7, 1944
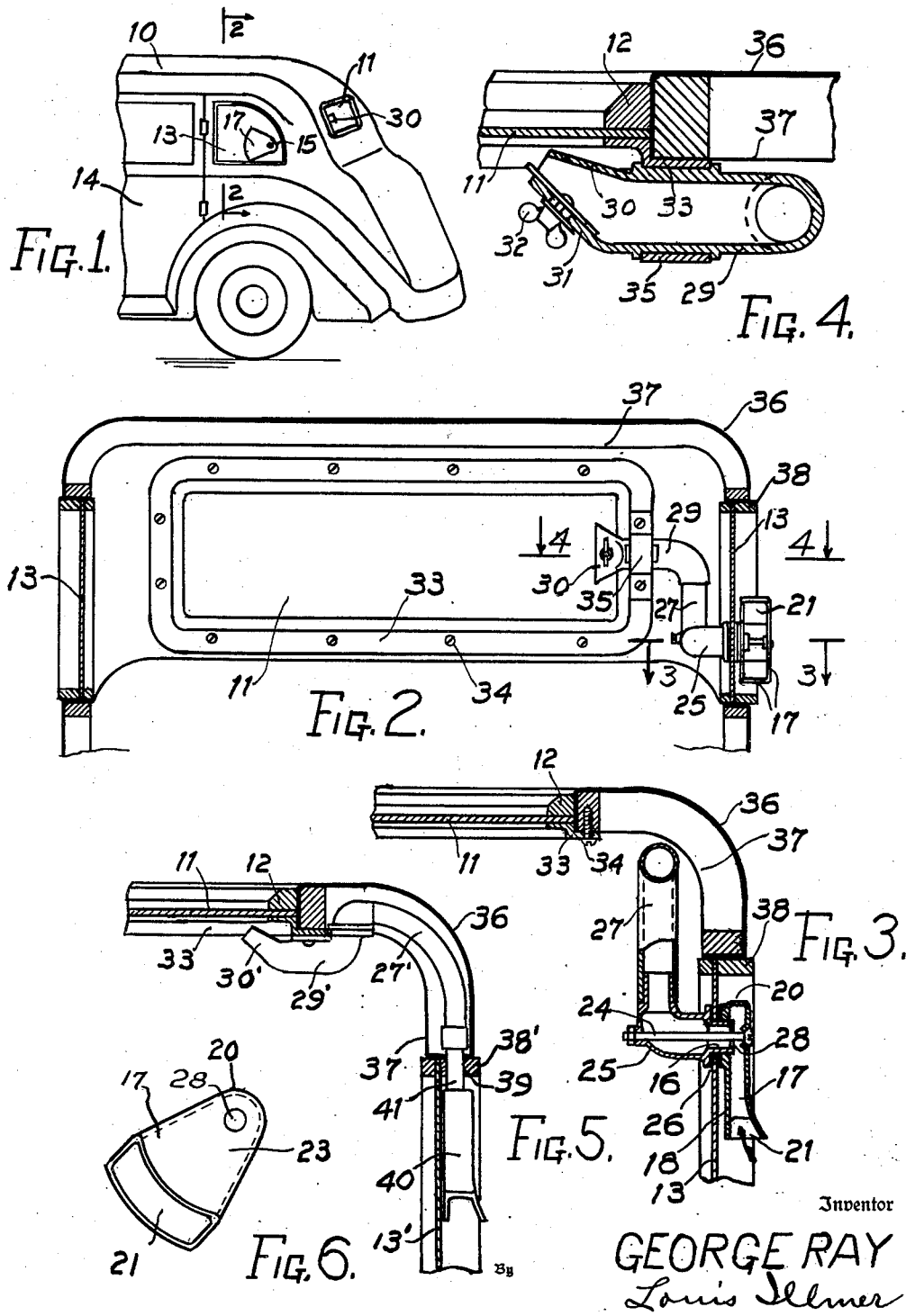
Inventor
GEORGE RAY
Louis Illmer
Attorney Patented Sept. 11, 1945

2,384,769

UNITED STATES PATENT OFFICE 2,384,769

REAR WINDOW DEHYDRATOR FOR AUTOMOBILE BODIES

George Ray, McGraw, N. Y.

Application March 7, 1944, Serial No. 525,471

4 Claims. (Cl. 98—2)

This invention pertains to a novel cold-weather automotive accessory of the self-contained air spray type for rendering an interiorly befogged rear window pane of a motor car body or truck cab free from surplus moisture condensate during winter driving whereby to afford a safe all-clear line of vision for a seated driver when required to look outwardly through such rear window.

The object of my improvements is to devise a low cost dehydrator unit for automobiles or the like by which to clear a befogged rear window pane in an inherently simple and automatic manner, also to contrive certain structural features that facilitate the application thereof to used cars as an independently marketable body accessory.

Reference is had to the accompanying one sheet of drawings that are illustrative of several exemplifications, and in which drawing:

Fig. 1 shows a rear perspective of a passenger car equipped with my dehydrator accessories.

Fig. 2 presents an assembly of such unit as seen from the vertical section 2—2 of Fig. 1.

Fig. 3 is a sectionalized body fragment taken along 3—3 of Fig. 2, and Fig. 4 a similar top view as seen from 4—4 of Fig. 2.

Fig. 5 is a view that corresponds to Fig. 3 and schematically depicts a modified inbuilt unit.

Fig. 6 is a perspective of an end outlet scoop used in Fig. 2.

In these disclosures, the sheathed automobile body 10 is provided with a fixedly mounted transverse rear window pane 11 of a conventional type retained by a weatherproof outer sash or window frame 12. The numeral 13 denotes a side tail window commonly installed behind each body door 14 and in close rectangular relationship to said rear pane 11.

When applying my noiseless dehydrator unit as an accessory to used cars, I preferably drill or otherwise perforate the lower rearward corner of said tail window with a small circular aperture as at 15 (see Fig. 1). Sealingly entered therethrough, is the elbow nipple 16 that may cooperate in the Fig. 3 fashion with a hollow air collector scoop 17 of the side opening type. Said scoop is preferably disposed exteriorly of the body confines to comprise laterally spaced flank walls such as 18 that may be fabricated from moulded plastic or stamped metal. These registering flanks may be given an acute sector-like shape and have their edges cross-connected by the rim arcuate wall 20 to leave an open mouth 21 in the divergent arc region of such shape. One such flank may be flared away from its mate to reduce air flow contraction. When installed, said open mouth is headed forwardly in the direction of normal vehicle travel to freely scoop up a supply of fresh air from the car exterior while en route and which air is given requisite mobility by the forward motor car movement.

The vertex region 23 of said rim wall may be given a semi-cylindrical contour at the center of which both flank walls may be alignedly apertured for the reception of a through clamping bolt 24. One such aperture constitutes an enlarged side outlet port 28 (see Fig. 6) which delivers directly into the body interior. A tubular elbow 25 has one end provided with a nipple 16 shown telescopically entered within the port 28 and doweled in place. The drilled tail pane 13 may be interposed between the abutting shouldered members 17 and 25, there being a pair of cushioning gaskets such as 26 used to seal these clamped members against leakage.

As detailed in Figs. 2 to 4, the opposite end of the elbow 25 may also be provided with a nipplelike extension that is tightly embraced by the flexible conduit 27 to convey air from the outlet port 28 to the ejector or nozzle agency 29. This nozzle is preferably kept elevated above the scoop outlet port and otherwise arranged in self trapping fashion. Such separator action suffices to keep the delivered air relatively dry and effectively prevent entrained rain or the like from being carried upwardly through the conduit 27.

It will be observed that the marginal confines of my outlet port 28 are kept radially inset to a substantial degree with respect to the partially circumscribing rim wall 20 in order that entrapped rain drops may by separator action readily sweep beyond such port to impinge against said wall and be drained out by the scoop mouth 21. The outer flat flank wall of the air scoop 17 is preferably non-overhangingly confined within the outwardly projecting limits of the annular tail window sash 38 to avoid being struck by passing traffic.

The ejector nozzle 29 is located interiorly of the body sheath 36 and may be provided with a flat spout 30 that inclinedly delivers air toward and along a localized interior face region of the rear pane 11. Said spout is shown equipped with a retractable throttle plate 31 that may be adjustably controlled by the thumb nut 32. The aim is to provide for a liberal passageway leading to my nozzle and to deliberately control the air flow as it impinges against the pane 11. As will be understood, the cleared region of said pane is intended to be located on the driver's side and in substantial registry with a conventional rear view mirror (not shown).

The pane 11 may be firmly secured between the outer sash or window frame 12 and the inner sash or frame 33. The last named may be demountably attached by the customary screws 34 and such standardized fastenings are preferably utilized to retain my nozzle and one conduit end in place by means of the saddle strap 35 or the like without relying for support upon the inner fabric lining 37. The design of my unit as an automotive accessory, is in other respects adapted to be easily installed in used cars without need of extensive body alterations. To this end, the conduit 27 is purposely disposed in double offset bend fashion to afford an inconspicuous and neat installation that does not mar the interior body trim.

Referring now to Fig. 5 (in which elements corresponding to the foregoing members are designated by primed numerals), this reveals a new equipment type of unit that may readily be inbuilt between the external body sheath 36 and its spaced lining 37. The relatively deep outer sash 38' of the tail window 13' may be transversely apertured as at 39 for the reception of a modified collector scoop of the open ended type. Such scoop provides for a tubular shank 41 extending radially rearward from the rim wall 20' that serves as an outlet port to which the conduit 27' is attached. Such concealed conduit leads to the nozzle 29' that may be kept similar to the spout devices shown in Figs. 2 and 4.

The mode of operation of my dehydrating air spray is thought to be obvious. It is generally recognized that the windows of an artificially heated closed car body may be cleared of interior moisture precipitation or the like befogged condition by widely opening one or more such windows until the body air temperature has become equalized with the surrounding atmosphere. My safety devices accomplish a like result that is purposely confined to the localized rear window region without requiring a corresponding lowering of the entire body temperature. That is to say, my defogging treatment is restricted to a limited rear body zone and kept free from pronounced drafts without inconvenience to the car occupants. As will be understood, the nozzle ejected air is usually drier than the air moisture content prevailing in the interior of a heated car body. When operative, my nozzle primarily serves to maintain adequate transparency through the cleared rear window pane whereby to guard against collision or the like accident and only incidentally provides for body ventilation.

The foregoing description will, it is believed, make evident to those skilled in this art, the more outstanding advantages and service benefits afforded by my dehydrator unit, and I reserve the right to reasonably modify the specifically disclosed embodiments, all without departing from the spirit and scope of the appended claims.

I claim:

1. A dehydrator accessory adapted to be applied to an automotive body equipped with a transverse rear window pane that is screw fastened in place by an inner frame and further equipped with an apertured side tail window retained by an endless outer frame, said accessory comprising a relatively flat air collector scoop disposed exteriorly alongside said tail window and having an outlet port delivering interiorly of the body through the aperture of said tail window, means for affixing said scoop to the tail window, a nozzle mounted to eject toward and along an inner face region of the rear window pane, a saddle strap affixed to the aforesaid inner frame by the screw fastenings thereof and serving to retain the nozzle in operative position, and a flexible conduit conveying collected air from said port for delivery through the nozzle, said strap further serving to retain in place the delivery end region of said conduit.

2. A dehydrator accessory adapted to be applied to an automotive body equipped with a transverse rear window pane and a side tail window having an aperture therethrough, said accessory comprising an air collector scoop arranged exteriorly alongside said tail window to comprise opposed flank walls of which one such is provided with an outlet port delivering interiorly of the body confines, a tubular elbow of which one end is provided with a nipple telescopically entered through the window aperture and into said port, means clamping the scoop and said elbow toward the interposed tail window, a nozzle mounted to inject toward and along an interior face region of said rear window pane in an elevated relation to the outlet port, and a flexible conduit conveying collected air from the other elbow end for delivery through the nozzle.

3. An automotive body accessory adapted to be applied to a body equipped with a transverse rear window pane and with an apertured side tail window retained by an endless outer frame that projects exteriorly beyond the last named pane, a relatively flat air collector scoop disposed flatwise alongside said tail window substantially within the projecting confines of said outer frame and which scoop is provided with an outlet port delivering interiorly of the body through the aperture of the tail window, means for affixing said scoop to the tail window, a nozzle directed to eject toward and along an inner face region of said rear window pane, means supporting said nozzle adjacent to the rear window pane, and a conduit bridgingly extending between said aperture and the nozzle in retained double offset bend formation to convey collected air for delivery through the nozzle.

4. A rain trapped dehydrator accessory adapted to be applied to an automotive body equipped with a transverse rear window pane and with an apertured side tail window, said accessory comprising a flared hollow air collector scoop disposed exteriorly alongside said tail window and provided with opposed flank walls respectively having sector-shaped edges and which scoop further includes a rim wall that cross-connects corresponding vertex regions of said edges, one such flank wall having an outlet port that delivers through the aperture of the tail window with the marginal confines of said port kept materially inset relative to the rim wall contour, means for affixing said scoop to the tail window, a nozzle elevated with respect to said port and mounted to eject toward and along the interior face of the rear pane, means supporting said nozzle adjacent to the last-named pane, and a conduit conveying collected air from said port for delivery through the nozzle.

GEORGE RAY.